J. Christy,
Nut Fastener,
N° 76,995. Patented Apr. 21, 1868.

Witnesses:

Rowbotham
S. H. Coxxie Godwin

Inventor:

James Christy
By his Atty
H. Howson

United States Patent Office.

JAMES CHRISTY, OF PHILADELPHIA, PENNSYLVANIA.

Letters Patent No. 76,995, dated April 21, 1868; antedated April 14, 1868.

IMPROVEMENT IN NUT-FASTENERS.

*The Schedule referred to in these Letters Patent and making part of the same.*

TO ALL WHOM IT MAY CONCERN:

Be it known that I, JAMES CHRISTY, of Philadelphia, Pennsylvania, have invented a Nut-Bolt and Set-Screw Retainer; and I do hereby declare the following to be a full, clear, and exact description of the same.

My invention consists of a wire, bent, secured, and arranged in respect to a nut, or the head of a bolt or screw, so as to effectually prevent the same from working loose, and yet permit them to be turned by an ordinary wrench.

In order to enable others to make and apply my invention, I will now proceed to describe a mode of constructing and using the same, reference being had to the accompanying drawing, which forms a part of this specification, and in which—

Figure 2:
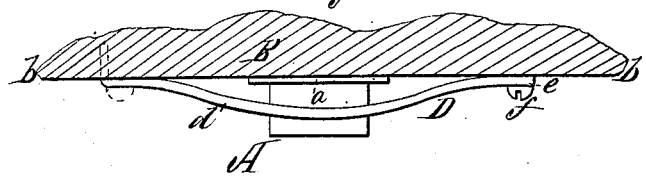
Figure 1:
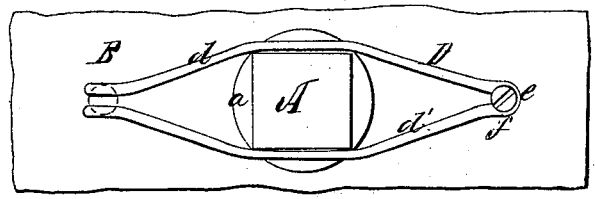

Figure 1 is a front view,

Figure 2 an edge view of my nut-bolt and set-screw retainer, and

Figure 3:
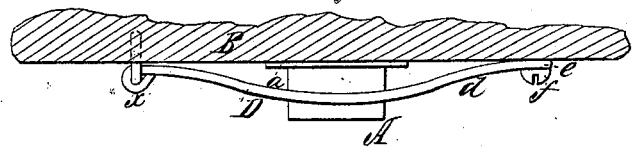

Figure 3 a modification of my invention.

A represents the nut of a bolt, and the line B indicates the face of the object against which the nut or its washer $a$ bears. The retainer D is composed of wire, bent to the shape, or approximating to the shape, (seen in fig. 1,) so as to form two legs or arms $d$ and $d'$, at the junction, $e$, of which is an abrupt bend, forming an elongated eye, through which passes a screw, $f$, into the object B. The outer ends of the two legs $d$ and $d'$ are bent abruptly, the bent ends being inserted into orifices in the object B, and being secured to the latter, if deemed necessary, by a set-screw or rivet.

The two arms of the retainer, thus constructed, are bent outwards in the middle, as seen in fig. 2, and bear against opposite edges of the nut $a$, thereby preventing the latter from working loose.

Owing to the length of the retainer, there is elasticity sufficient in the arms to permit the latter to yield on turning the nut, and to recover their former position when the flat sides of the nut are in line, or thereabouts, with the arms.

As the nut is turned, and the arms $d\ d'$ are consequently moved apart from each other, the retainer will be contracted in length, a contraction permitted by the elongated eye formed at the bend $e$, for the admission of the screw $f$.

Although I have referred to my invention as applied to the retention of a nut, A, it will be understood that it is equally well adapted to the retention of the head of a bolt or set-screw, and will be of especial use in the construction of railway-cars, and such machines as are subjected to sudden and violent shocks and strains, which tend to loosen bolts, nuts, and screws.

In the modification, illustrated in fig. 3, the ends of the arms $d$ are hinged to a staple, $x$, driven into or otherwise secured to the object B.

Without confining myself to any specific mode of securing the ends of the retainer, I claim as my invention, and desire to secure by Letters Patent—

The wire, D, bent, secured, and applied to a nut, or to a bolt or screw-head, substantially as and for the purpose described.

In testimony whereof, I have signed my name to this specification in the presence of two subscribing witnesses.

JAS. CHRISTY.

Witnesses:
JOHN WHITE,
C. B. PRICE.